United States Patent Office 3,443,454
Patented May 13, 1969

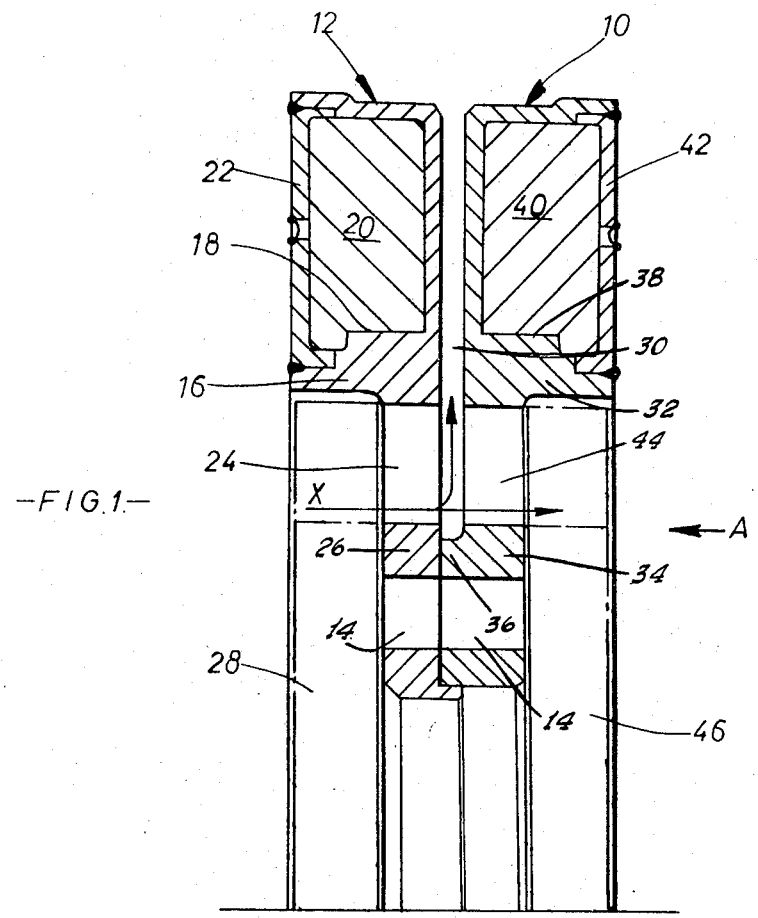
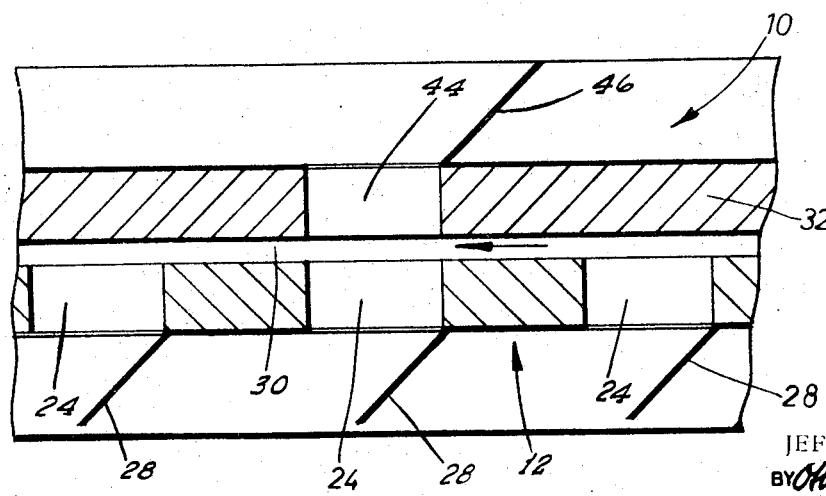

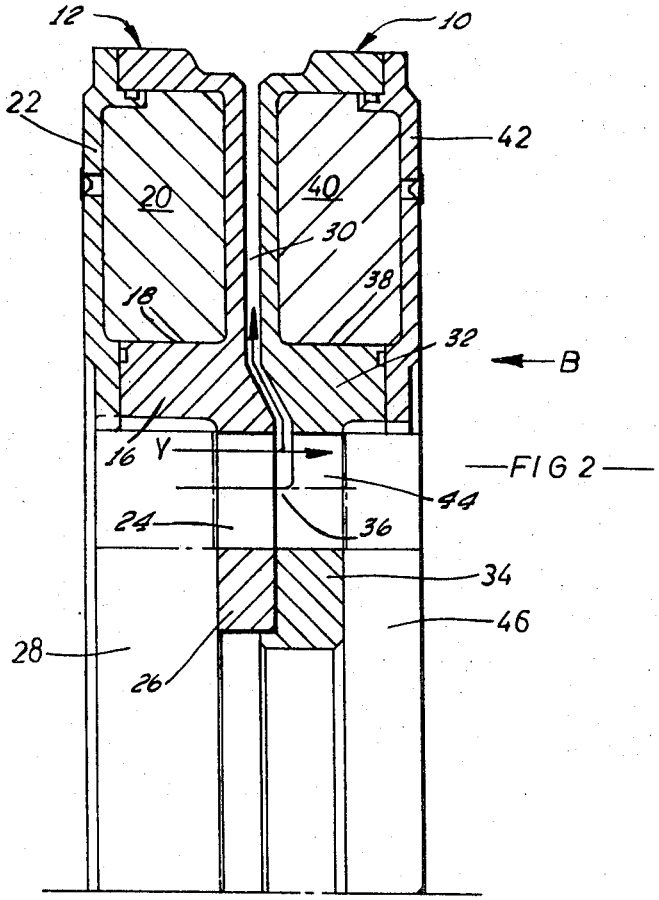
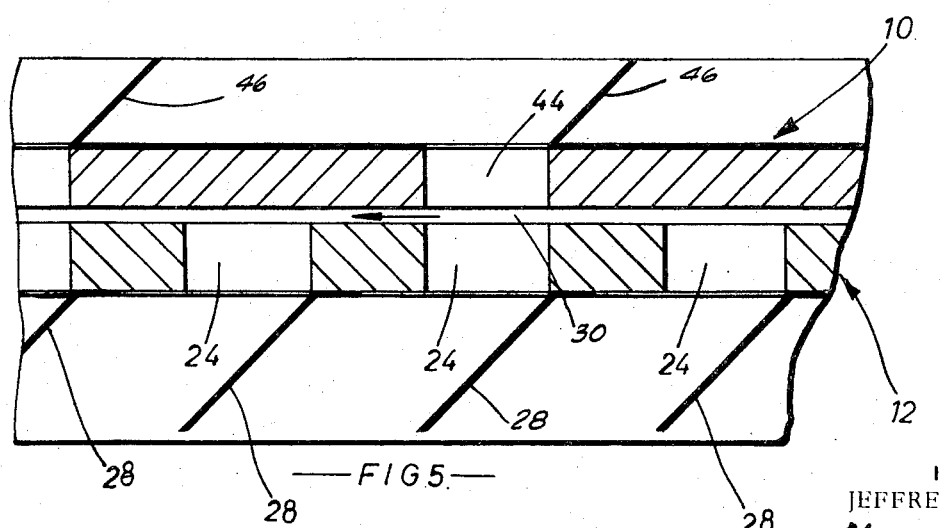

3,443,454
MEANS FOR COOLING TORSIONAL
VIBRATION DAMPER
Jeffrey Hall, Sheepridge, Huddersfield, England, assignor to Holset Engineering Company Limited, Turnbridge, Huddersfield, Yorkshire, England
Filed Mar. 28, 1967, Ser. No. 626,485
Claims priority, application Great Britain, July 19, 1966, 32,285/66
Int. Cl. F16f 1/16
U.S. Cl. 74—574                                    5 Claims

ABSTRACT OF THE DISCLOSURE

The invention concerns a torsional vibration damper including cooling means comprising a series of holes extending through the damper and fan blades attached to one or both sides of the damper.

The present invention relates to a torsional vibration damper of the type adapted for mounting, for example, on the crankshaft of an internal combustion engine, and relates in particular to such a damper wherein means are provided for cooling same when in operation.

Owing to the function of the torsional vibration damper, such dampers tend to become hot when in use and the present invention seeks to provide a torsional vibration damper including means for causing a flow of air over, around and through said damper whereby to assist cooling thereof.

According to the present invention a torsional vibration damper has a number of holes extending therethrough to allow passage of air through said damper, and fan blades are attached to said damper and arranged so as to cause an air flow through said holes from one side of the damper to the other when said damper is in operation.

The present invention is equally applicable to single dampers and twin or double dampers. In the case of twin or double dampers it is desirable that a part of the air flow should pass through only one unit of the damper.

The invention will now be further described by way of example with reference to the accompanying drawings in which:

FIGURE 1 is a sectional view of part of a damper embodying one form of the present invention;

FIGURE 2 is a sectional view of part of a damper embodying a modified form of the present invention;

FIGURE 4 is a sectional view taken generally along the line IV—IV of FIGURE 3a; and FIGURE 5 is a sectional view taken generally along the line V—V of FIGURE 3b.

Figure 3A:
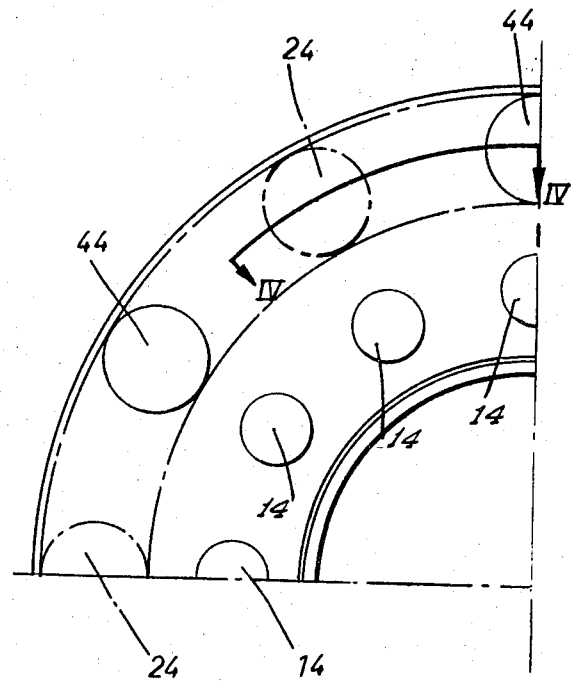
FIGURE 3a is a front view showing part of the damper of FIGURE 1 looking in the direction shown by arrow A.

Referring to FIGURES 1, 3a and 4, the damper shown comprises two damper units 10, 12 mounted in back to back relationship and provided with mounting apertures 14, which serve to adapt the two units 10, 12 to be bolted or otherwise rigidly secured together and also serving to adapt the damper to be bolted or otherwise rigidly secured to a hub member or the like which, in turn, may be mounted on a rotatable member, such as an internal combustion crankshaft, subject to torsional vibration. Damper unit 12, which in operation will be the front damper unit, i.e., the unit remote from the engine or other prime mover, comprises an annular plate 16, in which is formed an annular recess 18. Mounted in the annular recess 18 is an annular inertia element 20 having appreciable mass. The inertia element 20 is held in the recess 18 by means of cover plate 22. A number of holes 24 are formed in a central flange portion 26 of the damper unit 12 to allow passage of air therethrough. Associated with each hole 24 is a fan blade 28 attached to the face of flange 26. Each fan blade 28 extends forwardly from the edge of its associated hole 24, which is the trailing edge when the damper rotates in the direction indicated by the arrow in FIG. 4. The fan blades 28 are arranged such that, when the damper rotates in the direction indicated by the arrow in FIG. 4, air is caused to flow from the front face of damper unit 12 through holes 24 into space 30 formed between the two units 10, 12.

Damper unit 10, which in operation will be the rear damper unit i.e. the unit closest to the engine or other prime mover, comprises an annular plate 32 having a central flange 34 including a projecting portion 36 which abuts the rear face of the damper unit 12 thus providing the space 30. The damper unit 10 also includes a recess 38, inertia member 40 and cover plate 42, identical with the recess 18, the inertia member 20 and the cover plate 22 respectively of damper unit 12. A series of holes 44 are formed in the flange 34. The holes 44 are of the same dimensions as the holes 24 but there are only half as many holes 44 as there are holes 24. Associated with each hole 44 is a fan blade 46 which is attached to the face of flange 34 at the edge of its associated hole 44 which is the trailing edge when the damper rotates in the direction indicated by the arrow in FIG. 4. Each fan blade 46 extends rearwardly from the edge of its associated hole. The fan blades 46 are arranged such that, when the damper rotates in the direction indicated by the arrow in FIG. 4, air is drawn from space 30, through holes 44 to the space between the rear damper unit 10 and the engine or the like prime mover (not shown).

In operation the damper mounted for example on the crankshaft of an internal combustion engine rotates in the direction indicated by the arrow in FIG. 4. Cooling air is forced by fan blades 28 through holes 24 to chamber 30. Some of this air passes through chamber 30 to the periphery of the damper and so to the surrounding atmosphere. The remaining air is drawn from chamber 30 through holes 44 by fan blades 46. The path of cooling air is shown by arrow X on FIG. 1.

Figure 3B:
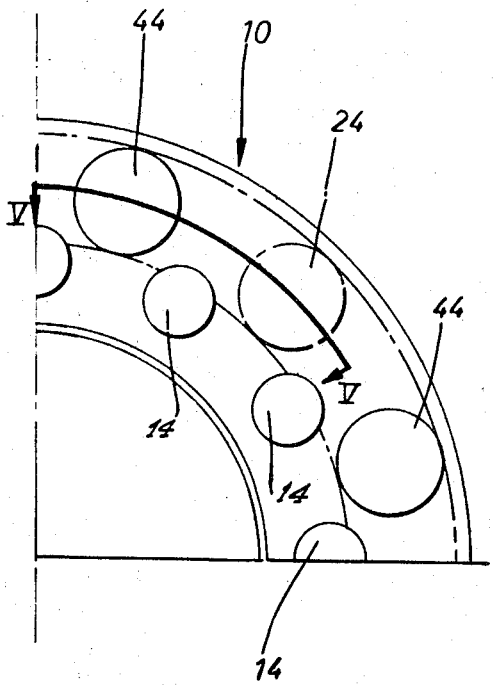
FIGURE 3b is a front view showing a part of the damper of FIGURE 2 looking in the direction shown by arrow B.

The construction and operation of the damper of FIGS. 2, 3b and 5 is extremely similar to that of the damper of FIGS. 1, 3a, and 4. The only major difference is that the peripheral portions of the facing surfaces of plates 16 and 32 are contoured as at 48 and 50 respectively to provide a bend in chamber 30. The flow of cooling air over the damper of FIGS. 2, 3b and 5 is indicated by the arrow Y in FIG. 2.

The embodiments illustrated have been described with reference to the case where the damper is to be placed adjacent the engine or other prime mover but is not located in a recess. When a twin damper of the invention is to be housed in a recess with only the front face of the damper exposed, the fan blades should be arranged such that when the damper is in operation the air pressure behind and over the periphery of the rear unit of the damper is greater than the air pressure in the gap behind and over the periphery of the front unit of the damper. The possibility of entrained air merely circulating round the rear unit of the damper, thus stopping the introduction of new cooling air, is avoided.

I claim:

1. A torsional vibration damper comprising a rotational member, and wherein the improvement comprises said rotational member having a plurality of holes formed therein to allow passage of air therethrough and a plurality of fan blades attached to said rotational member and arranged so as to cause an air flow through said holes from one side of said member to the other when rotating wherein the damper is a double damper and the fan blades and holes are arranged such that a part of the air flow passes through only one unit of the damper.

2. A damper according to claim 1 wherein a fan blade is associated with each hole.

3. A torsional vibration damper comprising a rotational member, and wherein the improvement comprises said rotational member having a plurality of holes formed therein to allow passage of air therethrough and a plurality of fan blades attached to said rotational member and arranged so as to cause an air flow through said holes from one side of said member to the other when rotating and wherein fan blades are arranged on the front face of the damper and one such blade extends from the trailing edge of each hole in the direction of travel of the damper when in operation.

4. A torsional vibration damper comprising a rotational member, and wherein the improvement comprises said rotational member having a plurality of holess formed therein to allow passage of air therethrough and a plurality of fan blades attached to said rotational member and arranged so as to cause an air flow through said holes from one side of said member to the other when rotating and wherein fan blades are arranged on the rear face of the damper and one such fan blade extends from the trailing edge of each hole in a rearward direction.

5. A torsional vibration damper comprising a rotational member, and wherein the improvement comprises said rotational member having a plurality of holes formed therein to allow passage of air therethrough and a plurality of fan blades attached to said rotational member and arranged so as to cause an air flow through said holes from one side of said member to the other when rotating and wherein the damper is a double damper and is housed in a recess with only its front face exposed and the fan blades are arranged such that when the damper is in operation the air pressure behind and over the periphery of the rear unit is greater than the air pressure in the gap behind and over the periphery of the front unit of the damper.

References Cited
UNITED STATES PATENTS

| | | | |
|---|---|---|---|
| 2,594,555 | 4/1952 | Hardy | 165—47 |
| 1,939,173 | 12/1933 | Junkers | 74—574 |

FRED C. MATTERN, JR., *Primary Examiner.*

W. S. RATTIFF, JR., *Assistant Examiner.*

U.S. Cl. X.R.

165—47